(12) United States Patent
Rath

(10) Patent No.: US 10,418,170 B2
(45) Date of Patent: Sep. 17, 2019

(54) SYSTEMS AND METHODS FOR REDUCING UNDESIRED EDDY CURRENTS

(71) Applicant: TAE TECHNOLOGIES, INC., Foothill Ranch, CA (US)

(72) Inventor: Nikolaus Rath, Foothill Ranch, CA (US)

(73) Assignee: TAE TECHNOLOGIES, INC., Foothill Ranch, CA (US)

(*) Notice: Subject to any disclaimer, the term of this patent is extended or adjusted under 35 U.S.C. 154(b) by 0 days.

(21) Appl. No.: 15/808,803

(22) Filed: Nov. 9, 2017

(65) Prior Publication Data
US 2018/0323007 A1 Nov. 8, 2018

Related U.S. Application Data

(63) Continuation of application No. PCT/US2016/031539, filed on May 9, 2016.

(60) Provisional application No. 62/160,421, filed on May 12, 2015.

(51) Int. Cl.
H01F 27/34 (2006.01)
G21B 1/05 (2006.01)
H05H 1/10 (2006.01)

(52) U.S. Cl.
CPC ............ *H01F 27/34* (2013.01); *G21B 1/052* (2013.01); *H05H 1/10* (2013.01); *H01F 2027/348* (2013.01); *Y02E 30/122* (2013.01)

(58) Field of Classification Search
None
See application file for complete search history.

(56) References Cited

U.S. PATENT DOCUMENTS

| 3,015,618 A | 1/1962 | Stix |
| 3,036,963 A | 5/1962 | Christofilos |
| 3,052,617 A | 9/1962 | Post |
| 3,071,525 A | 1/1963 | Christofilos |
| 3,120,470 A | 2/1964 | Imhoff et al. |
| 3,132,996 A | 5/1964 | Baker et al. |
| 3,170,841 A | 2/1965 | Post |
| 3,182,213 A | 5/1965 | Rosa |
| 3,258,402 A | 6/1966 | Farnsworth |
| 3,386,883 A | 6/1968 | Farnsworth |
| 3,527,977 A | 9/1970 | Ruark |

(Continued)

FOREIGN PATENT DOCUMENTS

| CN | 101320599 | 12/2008 |
| CN | 104051028 A | 9/2014 |

(Continued)

OTHER PUBLICATIONS

TW, 105114777 Search Report, dated Nov. 6, 2017.

(Continued)

*Primary Examiner* — Dion Ferguson
*Assistant Examiner* — Srinivas Sathiraju
(74) *Attorney, Agent, or Firm* — One LP

(57) ABSTRACT

Systems and methods to reduce the amplitude of undesirable eddy currents in conducting structures, e.g., induced by the translation of an FRC into a confinement chamber, while leaving beneficial eddy currents unaffected. This is achieved by inducing opposing currents in the same conducting structures prior to plasma translation into the confinement chamber.

20 Claims, 5 Drawing Sheets

(56) References Cited

U.S. PATENT DOCUMENTS

| | | |
|---|---|---|
| 3,530,036 A | 9/1970 | Hirsch |
| 3,530,497 A | 9/1970 | Hirsch et al. |
| 3,577,317 A | 5/1971 | Woods |
| 3,621,310 A | 11/1971 | Takeuchi et al. |
| 3,663,362 A | 5/1972 | Stix |
| 3,664,921 A | 5/1972 | Christofilos |
| 3,668,065 A | 6/1972 | Moir |
| 3,859,164 A | 1/1975 | Nowak |
| 4,010,396 A | 3/1977 | Ress et al. |
| 4,054,846 A | 10/1977 | Smith et al. |
| 4,057,462 A | 11/1977 | Jassby et al. |
| 4,065,351 A | 12/1977 | Jassby et al. |
| 4,098,643 A | 7/1978 | Brown |
| 4,166,760 A | 9/1979 | Fowler et al. |
| 4,182,650 A | 1/1980 | Fischer |
| 4,189,346 A | 2/1980 | Jarnagin |
| 4,202,725 A | 5/1980 | Jarnagin |
| 4,233,537 A | 11/1980 | Limpaecher |
| 4,246,067 A | 1/1981 | Linlor |
| 4,267,488 A | 5/1981 | Wells |
| 4,274,919 A | 6/1981 | Jensen et al. |
| 4,303,467 A | 12/1981 | Scornavacca et al. |
| 4,314,879 A | 2/1982 | Hartman et al. |
| 4,317,057 A | 2/1982 | Bazarov et al. |
| 4,347,621 A | 8/1982 | Dow |
| 4,350,927 A | 9/1982 | Maschke |
| 4,371,808 A | 2/1983 | Urano et al. |
| 4,390,494 A | 6/1983 | Salisbury |
| 4,397,810 A | 8/1983 | Salisbury |
| 4,416,845 A | 11/1983 | Salisbury |
| 4,434,130 A | 2/1984 | Salisbury |
| 4,483,737 A | 11/1984 | Mantei |
| 4,543,231 A | 9/1985 | Ohkawa |
| 4,543,465 A | 9/1985 | Sakudo et al. |
| 4,548,782 A | 10/1985 | Manheimer et al. |
| 4,560,528 A | 12/1985 | Ohkawa |
| 4,584,160 A | 4/1986 | Kageyama |
| 4,584,473 A | 4/1986 | Hashimoto et al. |
| 4,601,871 A | 7/1986 | Turner |
| 4,615,755 A | 10/1986 | Tracy et al. |
| 4,618,470 A | 10/1986 | Salisbury |
| 4,630,939 A | 12/1986 | Mayes |
| 4,639,348 A | 1/1987 | Jarnagin |
| 4,650,631 A | 3/1987 | Knorr |
| 4,687,616 A | 8/1987 | Moeller |
| 4,826,646 A | 5/1989 | Bussard |
| 4,853,173 A | 8/1989 | Stenbacka |
| 4,894,199 A | 1/1990 | Rostoker |
| 4,904,441 A | 2/1990 | Sorensen et al. |
| 4,922,800 A * | 5/1990 | Hoffman ................ F41B 6/006 124/3 |
| 5,015,432 A | 5/1991 | Koloc |
| 5,041,760 A | 8/1991 | Koloc |
| 5,122,662 A | 6/1992 | Chen et al. |
| 5,160,694 A | 11/1992 | Steudtner |
| 5,160,695 A | 11/1992 | Bussard |
| 5,206,516 A | 4/1993 | Keller et al. |
| 5,207,760 A | 5/1993 | Dailey et al. |
| 5,339,336 A | 8/1994 | Sudan |
| 5,355,399 A | 10/1994 | Golovanivsky et al. |
| 5,420,425 A | 5/1995 | Bier et al. |
| 5,422,481 A | 6/1995 | Louvet |
| 5,451,877 A * | 9/1995 | Weissenberger ...... G01R 33/385 324/312 |
| 5,473,165 A | 12/1995 | Stinnett et al. |
| 5,483,077 A | 1/1996 | Glavish |
| 5,502,354 A | 3/1996 | Correa et al. |
| 5,537,005 A | 7/1996 | Goebel et al. |
| 5,557,172 A | 9/1996 | Tanaka |
| 5,656,519 A | 8/1997 | Mogami |
| 5,656,819 A | 8/1997 | Greenly |
| 5,677,597 A | 10/1997 | Tanaka |
| 5,747,800 A | 5/1998 | Yano et al. |
| 5,764,715 A | 6/1998 | Maenchen et al. |
| 5,811,201 A | 9/1998 | Skowronski |
| 5,846,329 A | 12/1998 | Hori et al. |
| 5,848,110 A | 12/1998 | Maenchen et al. |
| 5,923,716 A | 7/1999 | Meacham |
| 6,000,360 A | 12/1999 | Koshimizu |
| 6,084,356 A | 7/2000 | Seki et al. |
| 6,245,190 B1 | 6/2001 | Masuda et al. |
| 6,248,251 B1 | 6/2001 | Sill |
| 6,255,648 B1 | 7/2001 | Littlejohn et al. |
| 6,271,529 B1 | 8/2001 | Farley et al. |
| 6,322,706 B1 | 11/2001 | Ohkawa |
| 6,335,535 B1 | 1/2002 | Miyake et al. |
| 6,345,537 B1 | 2/2002 | Salamitou |
| 6,376,990 B1 * | 4/2002 | Allen ...................... H05H 7/18 315/111.61 |
| 6,390,019 B1 | 5/2002 | Grimbergen et al. |
| 6,396,213 B1 | 5/2002 | Koloc |
| 6,408,052 B1 | 6/2002 | McGeoch |
| 6,452,168 B1 | 9/2002 | McLuckey et al. |
| 6,466,017 B1 * | 10/2002 | Ganin .................. G01R 33/482 324/307 |
| 6,477,216 B2 | 11/2002 | Koloc |
| 6,488,807 B1 | 12/2002 | Collins et al. |
| 6,593,539 B1 | 7/2003 | Miley et al. |
| 6,593,570 B2 | 7/2003 | Li et al. |
| 6,611,106 B2 | 8/2003 | Monkhorst et al. |
| 6,628,740 B2 | 9/2003 | Monkhorst et al. |
| 6,632,324 B2 | 10/2003 | Chan |
| 6,664,740 B2 | 12/2003 | Rostoker et al. |
| 6,712,927 B1 | 3/2004 | Grimbergen et al. |
| 6,755,086 B2 | 6/2004 | Salamitou et al. |
| 6,850,011 B2 | 2/2005 | Monkhorst et al. |
| 6,852,942 B2 | 2/2005 | Monkhorst et al. |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,903,550 B2 * | 6/2005 | Uetake ............. G01R 33/56518 324/307 |
| 6,995,515 B2 | 2/2006 | Rostoker et al. |
| 7,002,148 B2 | 2/2006 | Monkhorst et al. |
| 7,002,343 B2 * | 2/2006 | Weissenberger ... G01R 33/3875 324/309 |
| 7,015,646 B2 | 3/2006 | Rostoker et al. |
| 7,026,763 B2 | 4/2006 | Rostoker et al. |
| 7,115,887 B1 | 10/2006 | Hassanein et al. |
| 7,119,491 B2 | 10/2006 | Rostoker et al. |
| 7,126,284 B2 | 10/2006 | Rostoker et al. |
| 7,129,656 B2 | 10/2006 | Rostoker et al. |
| 7,180,242 B2 | 2/2007 | Rostoker et al. |
| 7,232,985 B2 | 6/2007 | Monkhorst et al. |
| 7,391,160 B2 | 6/2008 | Monkhorst et al. |
| 7,439,678 B2 | 10/2008 | Rostoker et al. |
| 7,459,654 B2 | 12/2008 | Monkhorst et al. |
| 7,477,718 B2 | 1/2009 | Rostoker et al. |
| 7,569,995 B2 | 8/2009 | Rostoker et al. |
| 7,613,271 B2 | 11/2009 | Rostoker et al. |
| 7,719,199 B2 * | 5/2010 | Monkhorst ............... G21B 1/00 315/111.21 |
| 7,786,675 B2 * | 8/2010 | Yakovlev ................ H05H 7/22 315/5.39 |
| 7,816,870 B2 * | 10/2010 | Yakovlev ................ H05H 7/22 315/5.39 |
| 8,031,824 B2 | 10/2011 | Bystriskii et al. |
| 8,461,762 B2 | 6/2013 | Rostoker et al. |
| 8,836,248 B2 * | 9/2014 | Verheijen ............... G03G 15/55 315/500 |
| 8,854,037 B2 * | 10/2014 | Feiweier .......... G01R 33/56518 324/307 |
| 9,072,156 B2 * | 6/2015 | Caporaso ............... H05H 9/005 |
| 9,157,973 B2 * | 10/2015 | Yamanaka ......... G01R 33/3852 |
| 9,265,137 B2 | 2/2016 | Rostoker et al. |
| 9,370,086 B2 | 6/2016 | Rostoker et al. |
| 9,386,676 B2 | 7/2016 | Rostoker et al. |
| 9,564,248 B2 * | 2/2017 | Bystriskii ............... G21B 1/052 |
| 9,591,740 B2 | 3/2017 | Belchenko et al. |
| 9,672,943 B2 | 6/2017 | Rostoker et al. |
| 9,924,587 B2 * | 3/2018 | Belchenko ............... H05H 3/02 |
| 9,997,261 B2 * | 6/2018 | Tuszewski ............... G21B 1/052 |
| 10,002,680 B2 * | 6/2018 | Laberge .................. G21B 3/00 |

(56) References Cited

U.S. PATENT DOCUMENTS

| | | | |
|---|---|---|---|
| 10,049,774 B2* | 8/2018 | Tuszewski | G21B 1/052 |
| 2001/0006093 A1 | 7/2001 | Tabuchi et al. | |
| 2002/0101949 A1* | 8/2002 | Nordberg | G21B 1/05 |
| | | | 376/122 |
| 2003/0197129 A1 | 10/2003 | Murrell et al. | |
| 2003/0230240 A1 | 12/2003 | Rostoker et al. | |
| 2003/0230241 A1 | 12/2003 | Rostoker et al. | |
| 2004/0046554 A1 | 3/2004 | Carlini | |
| 2004/0213368 A1 | 10/2004 | Rostoker et al. | |
| 2004/0251996 A1* | 12/2004 | Nordberg | G21B 1/05 |
| | | | 335/295 |
| 2005/0249324 A1* | 11/2005 | Meacham | G21B 1/05 |
| | | | 376/133 |
| 2006/0198485 A1 | 9/2006 | Binderbauer | |
| 2006/0202687 A1* | 9/2006 | Wang | G01N 27/9046 |
| | | | 324/238 |
| 2008/0226011 A1 | 9/2008 | Barnes | |
| 2010/0020913 A1* | 1/2010 | Mozgovoy | G21B 1/052 |
| | | | 376/133 |
| 2011/0142185 A1* | 6/2011 | Woodruff | G21B 1/05 |
| | | | 376/121 |
| 2011/0293056 A1 | 12/2011 | Slough | |
| 2012/0217966 A1* | 8/2012 | Feiweier | G01R 33/56518 |
| | | | 324/307 |
| 2014/0084925 A1 | 3/2014 | Nieminen et al. | |
| 2015/0187443 A1* | 7/2015 | Tuszewski | G21B 1/052 |
| | | | 376/101 |
| 2015/0216028 A1 | 7/2015 | Laberge et al. | |
| 2016/0098058 A1 | 4/2016 | Morehouse et al. | |
| 2016/0276044 A1 | 9/2016 | Tuszewski et al. | |
| 2017/0135194 A1 | 5/2017 | Belchenko et al. | |
| 2017/0236599 A1 | 8/2017 | Bystriskii et al. | |
| 2017/0359886 A1 | 12/2017 | Binderbauer et al. | |

FOREIGN PATENT DOCUMENTS

| | | |
|---|---|---|
| EP | 2389048 A2 | 11/2011 |
| FR | 2 270 733 A1 | 12/1975 |
| GB | 1387098 A | 3/1975 |
| RU | 2056649 C1 | 3/1996 |
| WO | WO 2014/114986 A1 | 7/2014 |

OTHER PUBLICATIONS

WO, PCT/US2016/031539 ISR and Written Opinion, dated Aug. 18, 2016.
Anderson, M., et al., "Plasma and Ion Beam Injection into an FRC", Plasma Physics Reports, 2005, vol. 31, No. 10, pp. 809-817.
Arsenin, V.V., et al., "Suppression of plasma instabilities by the feedback method", Soviet Physics Uspekhi, 1977, vol. 20, No. 9, pp. 736-745.
Artsimovich, L.A., "Controlled Thermonuclear Reactions", English Edition, 1964, Gordon and Breach, Science Publishers, Inc., New York, pp. 1-9.
Asai, T., et al., "End Loss Measurement of Neutral-Beam-Injected Field-Reversed Configuration Plasma", J. Plasma Fusion Res. Series, vol. 5, 2002, pp. 220-224.
Avanzini, P.G., "Feasibility of Fusion Power Generation by Accelerated Ion Beams", ICENES, Jun. 30-Jul. 4, 1986, Geneva, Italy, pp. 305-309.
Becker, H.W., et al., "Low-Energy Cross Sections for $^{11}B(p,3\alpha)$", Z. Physics A—Atomic Nuclei, 1987, vol. 217, No. 3, pp. 341-355.
Binderbauer, M.W., et al., "Turbulent transport in magnetic confinement: how to avoid it", Journal of Plasma Physics, 1996, vol. 56, No. 3, pp. 451-465.
Binderbauer, M.W., et al., "Dynamic Formation of a Hot Field Reversed Configuration with Improved Confinement by Supersonic Merging of Two Colliding High-β Compact Toroids", Phys. Rev. Lett., 2010, vol. 105, No. 4, pp. 045003-1-045003-4.
Bohm, D., "Quantum Theory", 1951, Dover Publications, Inc., New York, Chapter 12—Applications to Simple Systems, The Classical Limit and the WKB Approximation, pp. 277-283.
Bystritskii, V., et al., "Generation and Transport of a Low-Energy Intense Ion Beam", IEEE Transactions on Plasma Science, 2004, vol. 32, No. 5, pp. 1986-1992.
Bystritskii, V., et al., "Study of Dense FRCs Formation and Their Transport With Multistage Compression", IEEE 2013 IEEE Pulsed Power and Plasma Science Conference (PPPS 2013)—San Francisco, CA, USA, Jun. 2013, 1 page.
Carlson, A., "Re: Boron/Proton colliding beam reactor?", 1997, retrieved from http://groups.google.com/groups?q=rostok . . . opuo.fsr%40s4awc.aug.ipp-garching.mpg.de, pp. 1-3.
Carlson, A., "Fundamental Limitations on Plasma Fusion Systems Not in Thermodynamic Equilibrium", 1997, retrieved from http://www.ipp.mpg.de/~Arthur.Carlson/rider.html, pp. 1-3.
Carlson, A., "Annotated Bibliography of p-B11 Fusion", 1998, retrieved from http://www.igg.mpg.de/~Arthur.carlson/p-B11-bib.html, pp. 1-4.
Carlson, A., "Home p. of Dr. A. Carlson", 2000, retrieved from http://www/rzg/mpg.de/~awc/home.html, pp. 1-2.
Carlson, A., "Re: Lithium Fission—why not?," 2000, retrieved from http://groups.google.com/groups?q=rostok . . . v35u.fsi%40suawc.aug.ipp-garching.mpg.de, pp. 1-2.
Chao, A.W., et al., Handbook of Accelerator Physics and Engineering, $2^{nd}$ Printing, 1998, World Scientific, Chapter 2, pp. 53, 119-120.
Cohen, S.A., et al., "Formation of Collisionless High-β Plasmas by Odd-Parity Rotating Magnetic Fields", Physical Review Letters, 2007, vol. 98, pp. 125002-1-145002-4.
Cohen, S.A., et al., "RMFo-Formed Collisionless High-β Plasmas: Yesterday, Today and Tomorrow", AIP Conference Proceedings, vol. 1154, 2009, pp. 165-166.
Cox, Jr., L/T., et al., "Thermonuclear Reaction Listing With Cross-Section Data for Four Advanced Reactions", Fusion Technology, 1990, vol. 18, No. 2, pp. 325-339.
Davis, H.A., et al., "Generation of Field-Reversing E Layers with Millisecond Lifetimes", Physical Review Letters, 1976, vol. 37, No. 9, pp. 542-545.
Dawson, J.M., "Advanced Fuels for CTR", Four Workshops in Alternate Concepts in Controlled Fusion, EPRI ER-429-SR, Special Report, Part B: Extended Summaries, 1977, pp. 143-147.
Dawson, J.M., "Alternate Concepts in Controlled Fusion", EPRI ER-429-SR, Special Report, Part C: CTR Using the p-$^{11}$ B Reaction, 1977, pp. ii-30.
Dobrott, D., "Alternate Fuels in Fusion Reactors", Nuclear Technology/Fusion, 1983, vol. 4, pp. 339-347.
Dolan, T.J, "Fusion Research", 1982, vol. II—Experiments, Pergamon Press, New York, pp. 277-309.
Feldbacher, R., et al., "Basic Cross Section Data for Aneutronic Reactor", Nuclear Instruments and Methods in Physics Research A271, 1988, pp. 55-64.
Finn, J.M., et al., "Field-Reversed Configurations With a Component of Energetic Particles", Nuclear Fusion, 1982, vol. 22, No. 11, pp. 1443-1518.
Garrido Alzar, C. L., et al., "Compensation of eddy-current-induced magnetic field transients in a MOT", 2007, retrieved from http://arxiv.org/pdf/physics/0701251.pdf.
Goldston, R.J., et al., "Fusion Alternatives", Science, 1997, vol. 278, No. 5346, pp. 2031-2037.
Gota, H., et al., A Well-Confined Field-Reversed Configuration Plasma Formed by Dynamic Merging of Two Colliding Compact Toroids in C-2, ICC and CT Workshops, Aug. 16, 2011, retrieved from http://www.iccworkshops.org/icc2011/uploads/241/icc2011_gota_talk_8_16_11.pdf, pp. 1-19.
Guo, H. Y., et al., "Flux Conversion and Evidence or Relaxation in a High-β Plasma Formed by High-Speed Injection into a Mirror Confinement Structure", Phys. Rev. Lett., 2004, vol. 92, No. 24, pp. 245001-1-245001-4.
Heidbrink, W.W., et al., "Comparison of Experimental and Theoretical Fast Ion Slowing-Down Times in DIII-D", Nuclear Fusion, 1988, vol. 28, No. 1, pp. 1897-1901.
Heidbrink, W.W., "Measurements of classical deceleration of beam ions in the DIII-D tokamak", Phys. Fluids B. 1990, vol. 2, No. 1, pp. 4-5.

(56) References Cited

OTHER PUBLICATIONS

Heidbrink, W.W., et al., "The diffusion of fast ions in Ohmic TFTR discharges", Phys. Fluids B, 1991, vol. 3, No. 11, pp. 3167-3170.
Heidbrink, W.W., et al., "The Behaviour of Fast Ions in Tokamak Experiments", Nuclear Fusion, 1994, vol. 34, No. 4, pp. 535-618.
Himura, H., et al., "Rethermalization of a field-reversed configuration plasma in translation experiments", Phys. Plasmas, 1995, vol. 2, No. 1, pp. 191-197.
Hoffman, A.L., et al., "Field Reversed Configuration Lifetime Scaling Based on Measurements From the Large s Experiment", Nucl. Fusion, 1993, vol. 33, No. 1, pp. 27-38.
Iwanenko, D., et al., "On the Maximal Energy Attainable in a Betatron", Physical Review, 1944, vol. 65, Nos. 11 and 12, p. 343.
Jeffries, C.D., "A Direct Determination of the Magnetic Moment of the Protons in Units of the Nuclear Magneton", Physical Review, 1951, vol. 81, No. 6, pp. 1040-1055.
Jones, I. R., "A review of rotating magnetic field current drive and the operation of the rotamak as a field-reversed configuration (Rotamak-FRC) and a spherical tokamak (Rotamak-ST)", Physics of Plasmas, 1999, vol. 6, No. 5, pp. 1950-1957.
Kalinowsky, H., "Deceleration of antiprotons from MeV to keV energies", Hyperfine Interactions, 1993, vol. 76, pp. 73-80.
Lampe, M., et al., "Comments on the Colliding Beam Fusion Reactor Proposed by Rostoker, Binderbauer and Monkhorst for Use with the p-$^{11}$B Fusion Reaction", Naval Research Lab., Plasma Physics Division, Oct. 30, 1998, pp. 1-37.
"Laval nozzle", 1992, Academic Press Dictionary of Science and Technology, retrieved from http://www.credoreference.com/entry/3122475/.
Lawson, J.D., "Some Criteria for a Power Producing Thermonuclear Reactor", Proc. Phys. Soc. B70, 1957, pp. 6-10.
Lifschitz, A.F., et al., "Calculations of tangential neutral beam injection current drive efficiency for present moderate flux FRCs", Nucl. Fusion, 2004, vol. 44, pp. 1015-1026.
Majeski, R., et al., "Enhanced Energy Confinement and Performance in a Low-Recycling Tokamak", Physical Review Letters, 2006, vol. 97, pp. 075002-1-075002-4.
Miley, G.H., et al., "A possible route to small, flexible fusion units", Energy, vol. 4, pp. 163-170.
Miley, G.H., et al., "On design and development issues for the FRC and related alternate confinement concepts", Fusion Engineering and Design, 2000, vol. 48, pp. 327-337.
Naitou, H., et al., "Kinetic Effects on the Convective Plasma Diffusion and the Heat Transport", Journal of the Physical Society of Japan, 1979, vol. 46, No. 1, pp. 258-264.
Nevins, W.M., "Feasibility of a Colliding Beam Fusion Reactor", Science, 1998, vol. 281. No. 5375, p. 307.
Okada, S., et al., "Experiments on additional heating of FRC plasmas", Nucl. Fusion, 2001, vol. 41, No. 5, pp. 625-629.
Ono, Y., et al., "New relaxation of merging spheromaks to a field reversed configuration", Nucl. Fusion, 1999, vol. 39, No. 11Y, pp. 2001-2008.
Phelps, D.A., et al., "Observations of the stable equilibrium and classical diffusion of field reversing relativistic electron coils", The Physics of Fluids, 1974, vol. 17, No. 12, pp. 2226-2235.
"Summary", Plasma Science—Advancing Knowledge in the National Interest, National Research Counsel of the National Academies, 2007, The National Academies Press, Washington, D.C., pp. 1-5.
Post, R.F., "Nuclear Fusion", McGraw-Hill Encyclopedia of Science & Technology, 6$^{th}$ Edition, 1987, pp. 142-153.
Rider, T.H., "A general critique of inertial-electrostatic confinement fusion systems", Physics Plasmas, 1995, vol. 2, No. 6, pp. 1853-1872.
Rider, T.H., "Fundamental limitations on plasma fusion systems not in thermodynamic equilibrium", Physics Plasmas, 1997, vol. 4, No. 4, pp. 1039-1046.
Robinson, Jr., C.A., "Army Pushes New Weapons Effort", Aviation Week & Space Technology, 1978, vol. 109, pp. 42-53.
Rosenbluth, M.N., et al., "Fokker-Planck Equation for an Inverse-Square Force", The Physical Review, 1957, vol. 107, No. 1, pp. 1-6.
Rostoker, N., "Large Orbit Magnetic Confinement Systems for Advanced Fusion Fuels", Final Technical Report, U.S. Dept. of Commerce, National Technical Information Service, Apr. 1, 1990-Feb. 29, 1992, pp. i-80.
Rostoker, N., et al., "Self-Colliding Systems for Aneutronic Fusion", Comments on Plasma Physics and Controlled Fusion, 1992, vol. 15, No. 2, pp. 105-120.
Rostoker, N., et al., "Large Orbit Confinement for Aneutronic Systems", Non-Linear and Relativistic Effects in Plasmids, editor V. Stefan, 1992, American Institute of Physics, New York, pp. 116-135.
Rostoker, N., et al., "Magnetic Fusion with High Energy Self-Colliding Ion Beams", Physical Review Letters, 1993, vol. 70, No. 12, pp. 1818-1821.
Rostoker, N., et al., "Self-Colliding Beams as an Alternative Fusion System", 10$^{th}$ International Conference on High Power Particle Beams, San Diego, CA, Jun. 20-24, 1994, pp. 195-201.
Rostoker, N., et al., "Classical Scattering in a High Beta Self-Collider/FRC", AIP Conference Proceedings 311, 1994, Physics of High Energy Particles in Toroidal Systems, Irvine, CA 1993, pp. 168-185.
Rostoker, N., et al., "Self-Colliding Beams as an Alternative Fusion System for D-He3 Reactors", Current Trends in International Fusion Research, edited by Panarella, Plenum Press, New York, 1997, Chapter 4, pp. 33-41.
Rostoker, N., et al., "Alternative Fusion Concepts", Current Trends in International Fusion Research, edited by Panarella, Plenum Press, New York, 1997, Chapter 32, pp. 489-495.
Rostoker, N., et al., "Fusion Reactors Based on Colliding Beams in a Field Reversed Configuration Plasma", Comments on Plasma Physics and Controlled Fusion, 1997, vol. 18, No. 1, pp. 11-23.
Rostoker, N., "Colliding Beam Fusion Reactor", 12$^{th}$ International Conference on High-Power Particle Beams, Proceedings—vol. 1, Jun. 7-12, 1997, Haifa, Israel.
Rostoker, N., et al., "Colliding Beam Fusion Reactor", Science, 1997, vol. 278, No. 5342, pp. 1419-1422.
Rostoker, N., "Advanced Fusion Energy and Future Energy Mix Scenarios", Abstracts with Programs, 1999 Annual Meeting & Exposition, Oct. 25-28, 1999, Denver, CO.
Ruggiero, A.G., "Proton-Boron Colliding Beams for Nuclear Fusion", Proceedings of ICONE 8, 8$^{th}$ International Conference on Nuclear Engineering, Apr. 2-6, 2000, Baltimore, MD, pp. 1-11.
Shishlov, A.V., et al., "Long time implosion experiments with double gas puffs", Physics of Plasmas, 2000, vol. 7, No. 4, pp. 1252-1262.
Smirnov, A., et al., "Neutral Beam Dump Utilizing Cathodic Arc Titanium Evaporation", Fusion Science and Technology, vol. 59, No. 1, 2010, pp. 271-273.
Smirnov, A., et al., "Neutral beam dump with cathodic arc titanium gettering", Rev. Sci. Instr., 2011, vol. 82, pp. 033509-1-033509-6.
Song, Y., et al., "Electron trapping and acceleration in a modified elongated betatron", Phys. Fluids B, 1992, vol. 4, No. 11, pp. 3771-3780.
Speth, E., et al., "Overview of RF Source Development at IPP", CCNB-Meeting at Padua, Jun. 5-6, 2003, pp. 1-29.
Steinhauer, L.C., et al., "FRC 2001: A White Paper on FRC Development in the Next Five Years", Fusion Technology, 1996, vol. 30, No. 1, pp. 116-127.
Tandem Energy Corporation Presentation, Dec. 12, 1997, Washington, D.C., pp. 1-47.
Tomita, Y., et al., "Direct Energy Conversion System for D-$^3$He Fusion", 7$^{th}$ International Conference on Emerging Nuclear Energy Systems, ICENES '93, 1994, pp. 522.526.
Tuszewski, M., "Field Reversed Configurations", Nuclear Fusion, 1988, vol. 28, No. 11, pp. 2033-2092.
Tuszewski, M., "Status of the Field-Reversed Configuration as an Alternate Confinement Concept", Fusion Technology, 1989, vol. 15, No. 11, pp. 1148-1153.
Vinyar, I., et al., "Pellet Injectors Developed at PELIN for JET, TAE, and HL-2A", Fusion Engineering and Design, 2011, vol. 86, pp. 2208-2211.

(56) References Cited

OTHER PUBLICATIONS

Ware, A.A., et al., "Electrostatic Plugging of Open-Ended Magnetic Containment Systems", Nuclear Fusion, 1969, vol. 9, No. 4, pp. 353-361.
Weaver, T., et al., "Exotic CTR Fuels for Direct Conversion-Utilizing Fusion Reactors", Talk before the AEC CTR Staff, Mar. 16, 1973, AEC/Germantown.
Weaver, T., et al., "Fusion Microexplosions, Exotic Fusion Fuels, Direct Conversion: Advanced Technology Options for CTR", Annual Meeting of the Committee on Advance Development and the Fusion Task Force of the Edison Electric Institute, Apr. 27, 1973, Los Alamos Scientific Laboratory, CA.
Weaver, T., et al., "Exotic CTR Fuels: Non-Thermal Effects and Laser Fusion Applications", 1973 Annual Meeting of the American Physical Society Division of Plasma Physics, Oct. 31-Nov. 3, 1973, Philadelphia, PA, pp. 1-12.
"Welcome to Colliding Beam Fusion", retrieved from http://fusion.ps.uci.edu/beam/introb.html on Oct. 11, 2000, pp. 1-3.
Wells, D. R., "Injection and Trapping of Plasma Vortex Structures", Phys. Fluids, 1966, vol. 9, No. 5, pp. 1010-1021.
Wessel, F.J., et al., "D-T Beam Fusion Reactor", Journal of Fusion Energy, 1998, vol. 17, No. 3, pp. 209-211.
Wessel, F.J., et al., "Colliding Beam Fusion Reactor Space Propulsion System", AIP Conference Proceedings 504, 2000, pp. 1425-1430.
"A White Paper on FRC Development", Apr. 1998, retrieved from http://depts.washington.edu/rppl/programs/wpr98.pdf, pp. 1-26.
Wong, H.V., et al., "Stability of annular equilibrium of energetic large orbit ion beam", Phys. Fluids B, 1991, vol. 3, No. 11, pp. 2973-2986.
Zweben, S.J., et al., "Radial Diffusion Coefficient for Counter-Passing MeV Ions in the TFTR Tokamak", Nuclear Fusion, 1991, vol. 31, No. 12, pp. 2219-2245.
SG, 11201708790V Written Opinion, dated Oct. 31, 2018.
EP, 16793344.9 Supplementary Search Report, dated Nov. 12, 2018.
Chapman, B. E., et al., "Observation of tearing mode deceleration and licking due to eddy current induced in a conducting shell", Physics of Plasma, 2004, vol. 11, No. 5, pp. 2156-2171.
Gnesotto, F., et al., "RFX: new tools for real-time MHD control", 2005, retrieved from http://www.iaea.org/inis/collection/NCLCollectionStore/_Public/36/080/36080672.pdf, pp. 1-8.

* cited by examiner

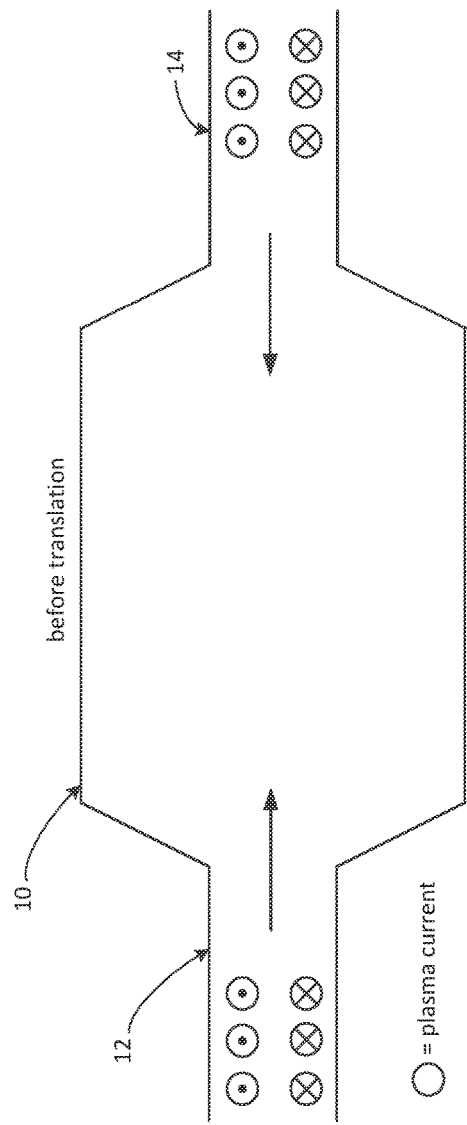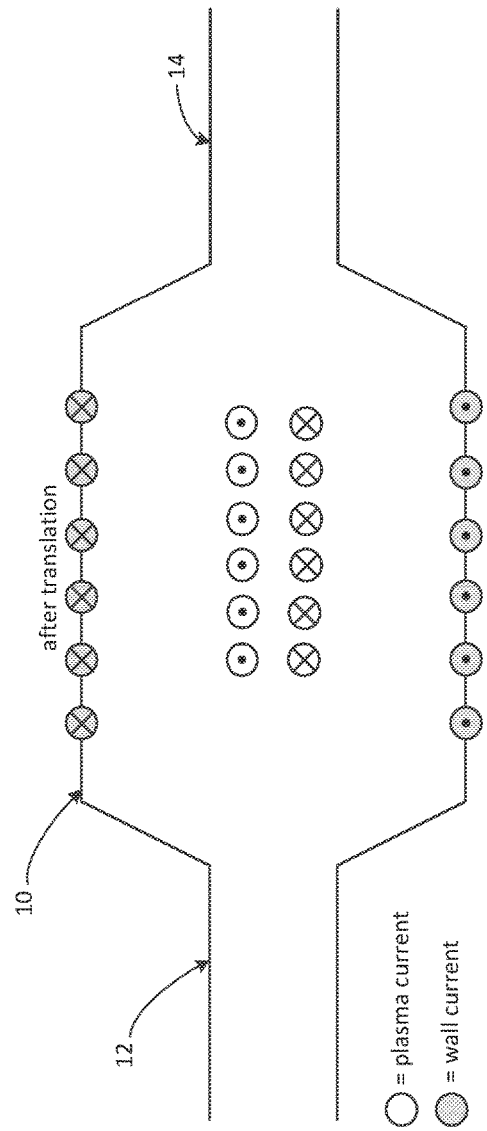

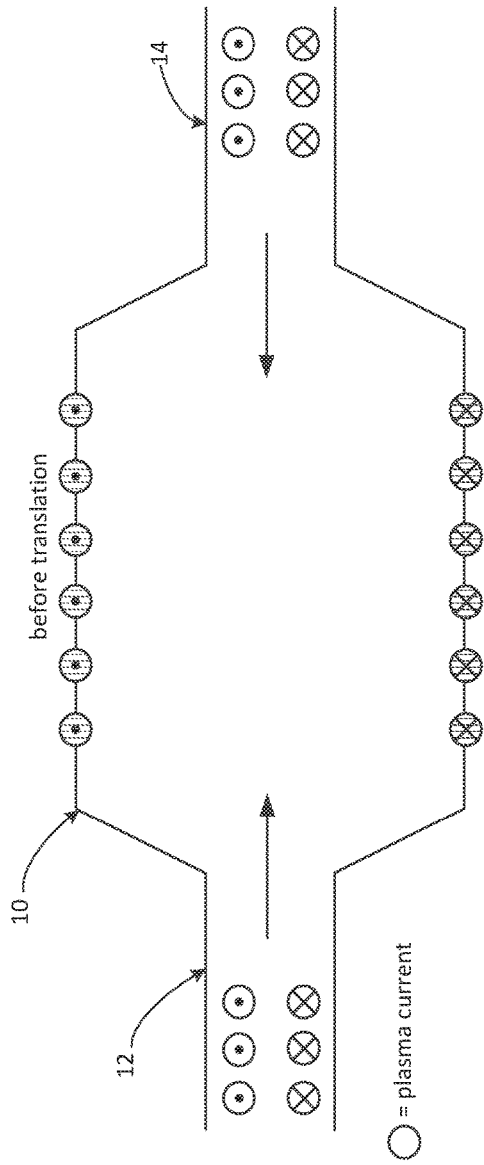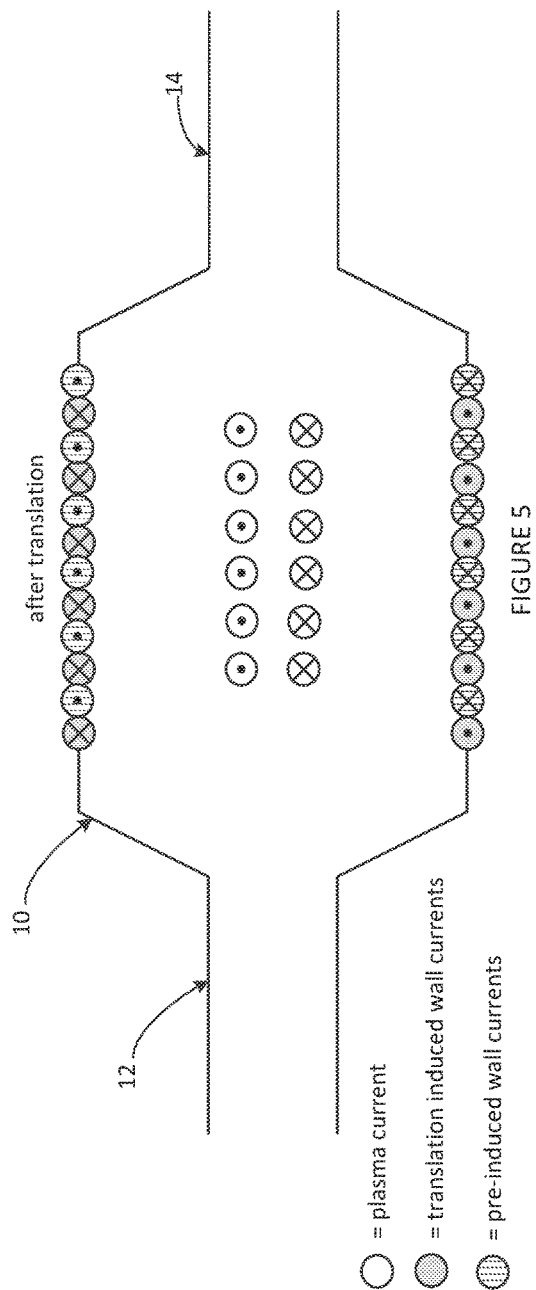

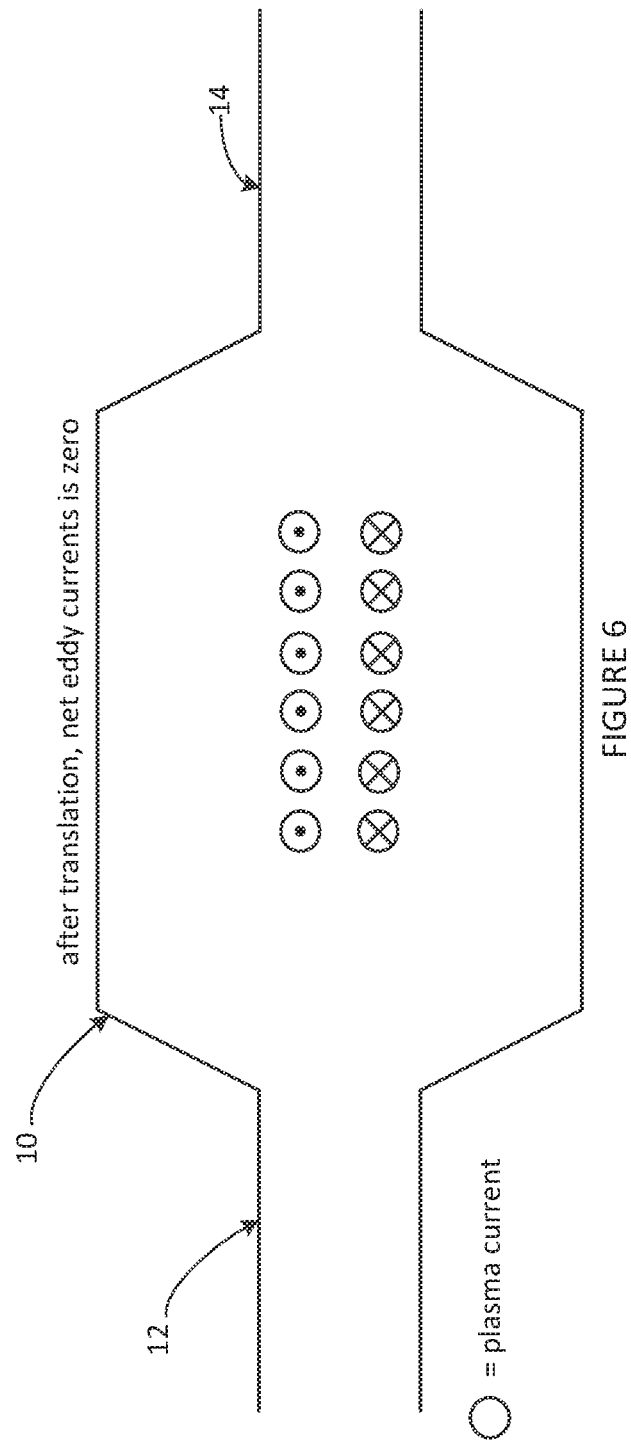

SYSTEMS AND METHODS FOR REDUCING UNDESIRED EDDY CURRENTS

CROSS-REFERENCE TO RELATED APPLICATIONS

The subject application is a continuation of PCT Patent Application No. PCT/US16/31539, filed May 9, 2016, which claims priority to U.S. Provisional Patent Application No. 62/160,421, filed on May 12, 2015, both of which are incorporated by reference herein in their entirety for all purposes.

FIELD

The subject matter described herein relates generally to magnetic plasma confinement systems and, more particularly, to systems and methods that facilitate cancellation of undesired eddy currents.

BACKGROUND

The Field Reversed Configuration (FRC) belongs to the class of magnetic plasma confinement topologies known as compact toroids (CT). It exhibits predominantly poloidal magnetic fields and possesses zero or small self-generated toroidal fields (see M. Tuszewski, Nucl. Fusion 28, 2033 (1988)). The traditional method of forming an FRC uses the field-reversed θ-pinch technology, producing hot, high-density plasmas (see A. L. Hoffman et al., Nucl. Fusion 33, 27 (1993)). A variation on this is the translation-trapping method in which the plasma created in a theta-pinch "source" is more-or-less immediately ejected out one end into a confinement chamber. The translating plasmoid is then trapped between two strong mirrors at the ends of the chamber (see, for instance, H. Himura et al., Phys. Plasmas 2, 191 (1995)).

Significant progress has been made in the last decade developing other FRC formation methods: merging spheromaks with oppositely-directed helicities (see, e.g. Y. Ono et al., Nucl. Fusion 39, 2001 (1999)) and by driving current with rotating magnetic fields (RMF) (see, e.g. I. R. Jones, Phys. Plasmas 6, 1950 (1999)) which also provides additional stability. Recently, the collision-merging technique, proposed long ago (see, e.g. D. R. Wells, Phys. Fluids 9, 1010 (1966)) has been significantly developed further: two separate theta-pinches at opposite ends of a confinement chamber simultaneously generate two plasmoids and accelerate the plasmoids toward each other at high speed; they then collide at the center of the confinement chamber and merge to form a compound FRC. In the construction and successful operation of one of the largest FRC experiments to date, the conventional collision-merging method was shown to produce stable, long-lived, high-flux, high temperature FRCs (see, e.g. M. Binderbauer et al., Phys. Rev. Lett. 105, 045003 (2010)).

When an FRC translates into the confinement section, it induces eddy currents in any conducting structure within its vicinity (e.g. the vessel wall or conducting in-vessel components). These eddy currents influence the plasma state and decay over time, thereby contributing to a continuous evolution of the plasma and preventing any steady-state until the eddy currents have decayed to negligible magnitudes. If the conducting structures are not axisymmetric (which is generally the case), the eddy currents break the axisymmetry of the FRC. Overall, such translation-induced eddy currents are undesirable. Their initial excitation imposes constraints on the plasma shape and thereby limits the ability of conducting structures to provide passive stabilization of plasma instabilities, and their decay over time complicates plasma control by requiring continuous compensation even in the absence of plasma instabilities. Furthermore, any beneficial effects of translation-induced eddy currents can also be provided by suitable adjustments of the equilibrium magnetic field.

Translation-induced eddy currents are not the only type of eddy currents that arise during experiments. Plasma instabilities may excite eddy currents which reduce the growth rate of the instability and are thus desirable. Eddy currents will also arise in response to neutral beam current ramp-up.

Plasma lifetimes in other FRC experiments have typically been limited to values significantly lower than the resistive timescale of the conducting wall, so that time-varying eddy currents did not pose any practical problems and have not been receiving much attention.

One related technique to prevent the excitation of translation-induced eddy currents is the use of insulating axial "gaps" in the vessel to prevent the excitation of axisymmetric eddy currents. The drawback of this method is that it requires structural changes to the conducting vessel, and that eddy currents are not suppressed but axisymmetric currents are transformed into 3-D currents. This thus aggravates the detrimental effects from 3-D fields and also makes the wall unsuitable for passive stabilization of axisymmetric plasma instabilities.

Three dimensional error fields are often corrected by error field correction coils that are themselves not axisymmetric. In the best case, such coils can eliminate as many harmonics as there are coils, but they tend to introduce new errors in the remaining harmonics and need to be able to follow any time-variation of the error fields during the experiment.

Therefore, it is desirable to provide systems and methods that facilitate the reduction or elimination of undesirable eddy currents.

SUMMARY OF INVENTION

Embodiments provided herein are directed to systems and methods that facilitate the reduction in amplitude of undesirable eddy currents (wall currents), e.g., translation-induced eddy currents such as eddy currents induce by translation of FRC plasmas, while leaving beneficial eddy currents unaffected. The reduction in amplitude of undesirable eddy currents is achieved by inducing opposing currents in the same structures prior to plasma translation, for example using active coils. If both tangential and normal components of the total magnetic field on a surface separating the plasma from the conducting structures are measured, the field can be decomposed into components produced by the plasma and components produced by exterior currents (eg. equilibrium coil currents). By subtracting the known fields from exterior coils, the field due to eddy current remains. The corresponding eddy current distribution can be reconstructed from the time evolution of this field. With the eddy current distribution known, active coils are used to induce a similar distribution with an opposite sign before the plasma translates into the chamber. Calculating the necessary coil currents requires knowledge of only the geometry of the active coils and passive structures. When the plasma translates into the confinement chamber, the two eddy current distributions superimpose and cancel. The more exact the eddy current distribution is reproduced, the more complete is the cancellation.

The systems and methods described herein advantageously:

reduce time-varying external fields due to decaying eddy currents, which interfere with plasma control;

reduce symmetry-breaking effects of a non-axisymmetric wall; since both pre-induced and translation-induced eddy currents have the same 3-D structure, 3-D fields are reduced without the need for non-axisymmetric coils; and enable the installation of close fitting, axisymmetric, in-vessel structures to increase passive stabilization of axisymmetric and non-axisymmetric instabilities.

Other systems, methods, features and advantages of the example embodiments will be or will become apparent to one with skill in the art upon examination of the following figures and detailed description.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 2 is a schematic of the chamber and formation tubes in FIG. 1 with a plasma present in the formation tube.

FIG. 3 is a schematic of the chamber and formation tubes in FIG. 1 following translation of the plasma into the chamber and showing translation-induced eddy currents formed in the wall of the chamber (translation induced wall currents).

FIG. 4 is the chamber and formation tubes in FIG. 1 prior to translation of the plasma into the chamber with pre-induced eddy currents formed in the wall of the chamber (pre-induced wall currents).

FIG. 5 is the chamber and formation tubes in FIG. 1 following translation of the plasma into the chamber and showing the pre-induced and translation-induced eddy currents in the wall of the chamber (pre-induced and translation-induced wall currents).

FIG. 6 is the chamber and formation tubes in FIG. 1 following translation of the plasma into the chamber and showing the translation-induced eddy currents in the wall of the chamber (translation induced wall currents) cancelled out by the pre-induced eddy currents in the wall of the chamber (pre-induced wall currents).

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Each of the additional features and teachings disclosed below can be utilized separately or in conjunction with other features and teachings to provide systems and methods that facilitate the reduction in amplitude of undesirable eddy currents (wall currents), e.g., translation-induced eddy currents, while leaving beneficial eddy currents unaffected. Representative examples of the embodiments described herein, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Embodiments provided herein are directed to systems and that facilitate the reduction in amplitude of undesirable eddy currents, e.g., translation-induced eddy currents such as eddy currents induced by translating FRC plasmas, while leaving beneficial eddy currents unaffected. The eddy currents induced by translating FRC plasmas do not depend on the prior field configuration or on the presence of prior currents. Therefore, if the currents induced by the plasma translation are undesirable, they can be eliminated by creating an equal and opposite current pattern before the plasma translates.

Figure 1:
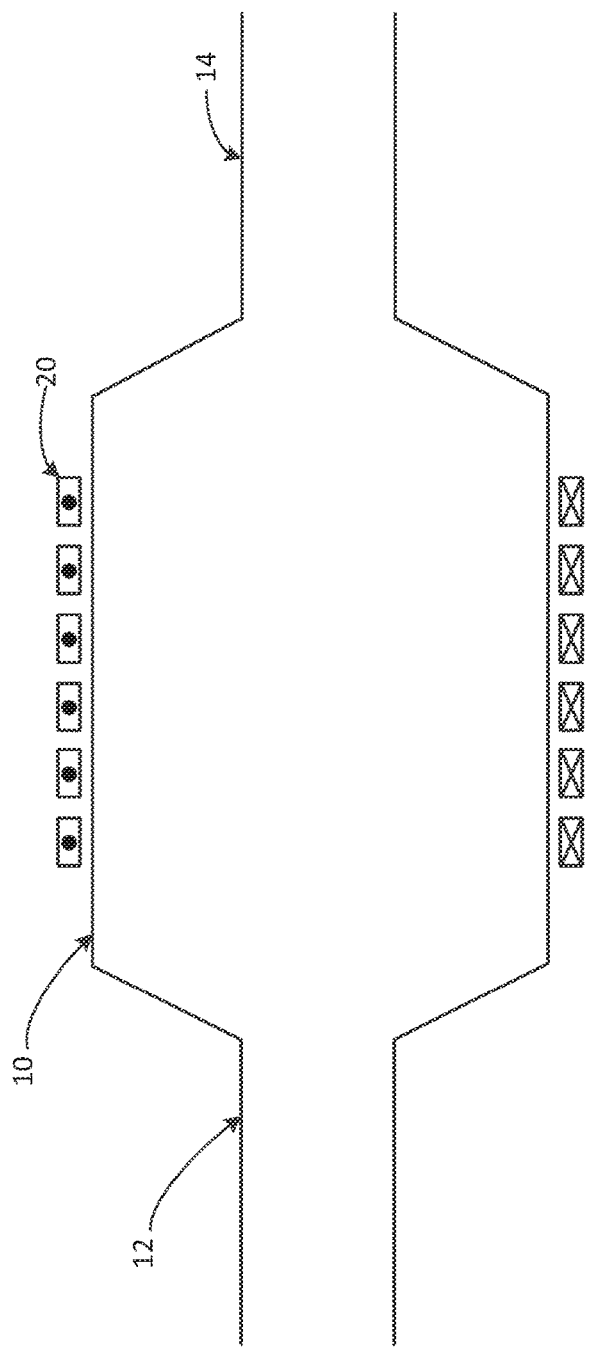
FIG. 1 is a schematic of a chamber or vessel with formation tubes attached to opposing ends and axisymmetric coils positioned around the wall of the chamber for inducing eddy currents in the wall of the chamber (wall currents).

In practice, this can be achieved, as shown in FIG. 1, with axisymmetric active coils 20 positioned around the inside or the outside of the vessel 10. Plasmas, such as, e.g., FRC plasmas, are formed in and translated toward the mid-plane of the vessel 10 from formation tubes 12 and 14 positioned on opposing ends of the vessel 10. A detailed discussion of systems and methods for forming and maintaining an FRC plasma is provided in published PCT Application No. WO 2015048092, which claims priority to U.S. Provisional Patent Application No. 61/881,874 and U.S. Provisional Patent Application No. 62/001,583, which applications are incorporated herein by reference as if set forth in full.

Figure 1A:
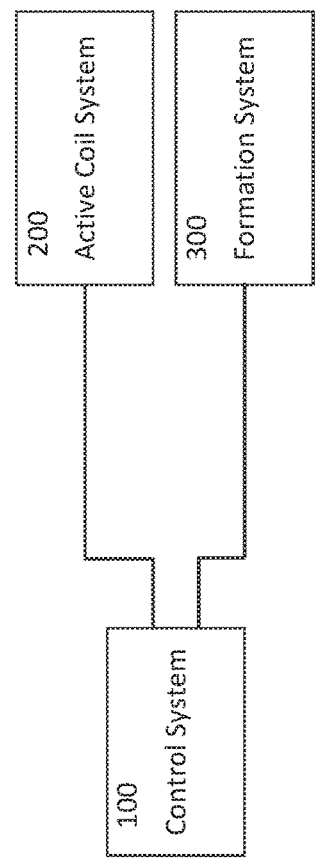
FIG. 1A is a schematic showing a control system coupled to an active coil system and a formation system.

As shown in FIG. 1A, a control system 100 is coupled to an active coil system 200 comprising the active coils 20, power supplies and the like, and to a formation system comprising the formation tubes 12 and 14, coils or straps, power supplies and the like.

Prior to plasma translation from the formation tubes 12 and 14, the coils 20 are ramped-up and held at constant current until all eddy currents in the wall of the vessel 10 have decayed. At this point current to the coils 20 is interrupted and the plasma formation sequence is started. The interruption of current to the coils 20 will excite a specific eddy current distribution in the wall of the vessel 10 to conserve the flux through the vessel 10, until a subsequent flux injection from the translating plasma reduces the eddy currents in the wall of the vessel 10 back towards zero. Alternatively, the coils 20 may be quickly ramped-up just before the plasma translates. In this case, the quick ramp-up will produce the desired eddy current distribution in the wall of the vessel 10, and the subsequent flux injection from the translated plasma will bring the eddy currents back to zero. After translation, currents in the coils 20 are kept constant. This method may be used if the characteristic eddy current decay time of the wall 10 is sufficiently slow compared to the rate at which the coils 20 can be ramped up. Cancellation can generally be increased by optimizing the geometry of the active coils, but even with the active coil geometry prescribed, the eddy current amplitude can be reduced.

To determine the currents in the active coils that will maximize eddy current cancellation, the eddy current distribution induced by the plasma has to be measured. This can be done by measuring at least two components of the magnetic field in the region between the conducting structures and the plasma. With two components of the magnetic field known, the magnetic field can then be separated into components due to the plasma and due to external currents. This is easily seen in a cylindrical geometry, i.e., for a given mode number m and phase, the magnetic scalar potential is determined by two amplitudes, one for the term proportional to $r^m$, and the other for the term proportional to $r^{-m}$. Having two measurements of the magnetic field at the same spatial point allows solving for both coefficients, and the field from the plasma is trivially identified with the term proportional to $r^m$. In more complicated geometries the mathematics are not as straightforward but the same procedure can be used. With the time evolution of both the internal and external magnetic field known, the current distribution in the conducting structures can be computed by least-squares fitting to a finite-element circuit model.

FIGS. 2-6 illustrate the basic idea of reducing translation-induced eddy currents. Plasma currents (white filled), plasma induced wall currents (gray filled), and pre-induced wall currents (cross-hatched filled) are shown in the figures in two stages, i.e., 1) prior to translation and 2) after translation. In FIGS. 2 and 3, no wall currents have been pre-induced in the wall of the vessel 10, so the net current in the wall is a non-zero value after translation of the plasma from the formation tubes 12 and 14. In FIGS. 4-6, some currents have been pre-induced in the wall of the vessel 10. After translation of the plasma from the formation tubes 12 and 14, the net current in the wall becomes zero.

Figure 7:
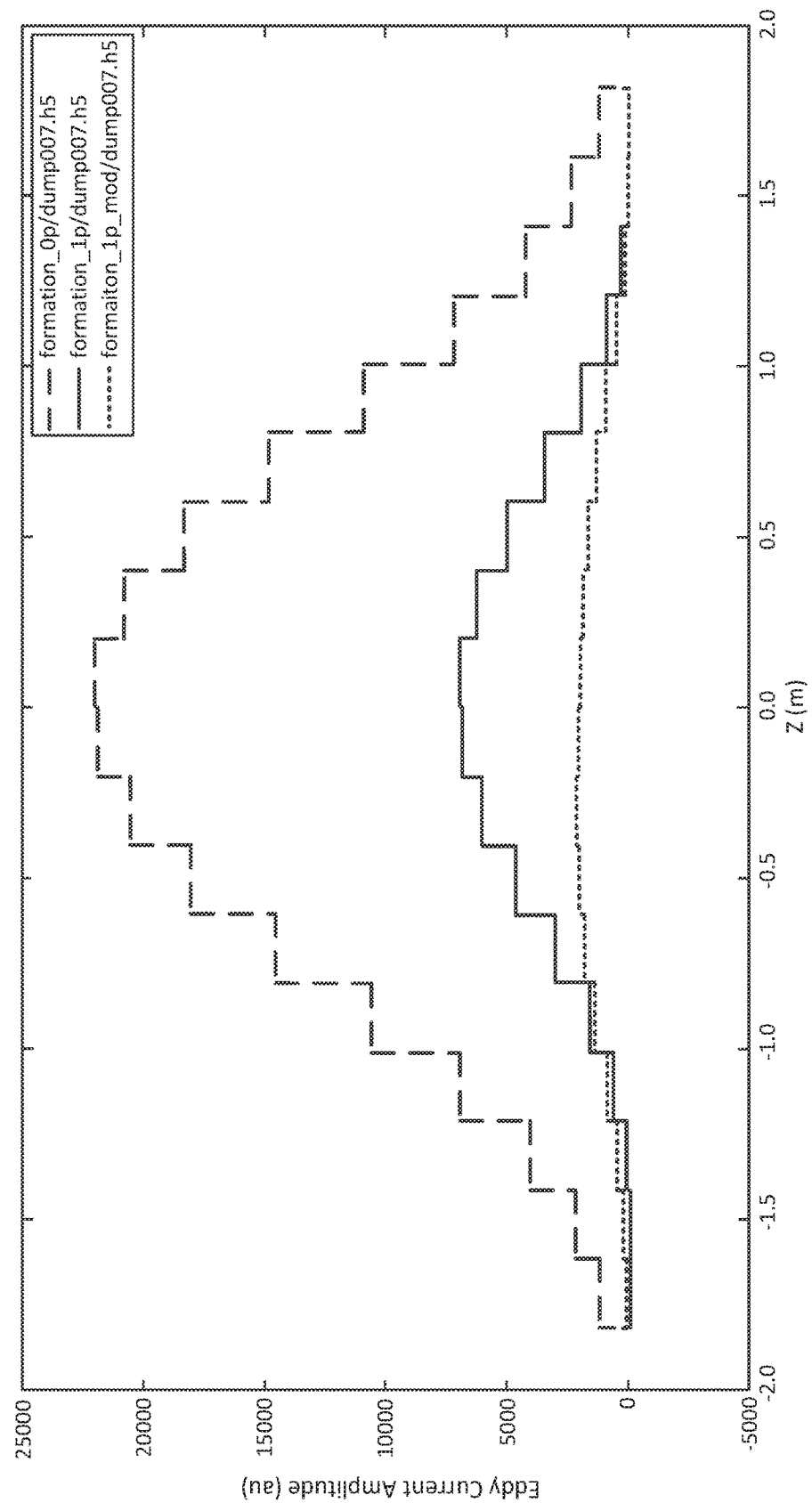
FIG. 7 is a graph showing the simulated eddy current distribution in an axisymmetric wall of the chamber (simulated wall current distribution) for three (3) cases: (1) no pre-induced, (2) pre-induced, and (3) pre-induced and adjusted vacuum field.

Application of the proposed technique has been simulated using LamyRidge, a 2-fluid simulation code to evaluate its effects on plasma formation and translation. FIG. 7 shows the eddy current distribution in an axisymmetric wall two hundred microseconds (200 ms) after formation for three different cases:

1) In case 1 (— —), no eddy current compensation was utilized, resulting in a plasma with separatrix radius 39 cm and elongation 2.5.
2) In case 2 (———) an (exactly) opposing current pattern was put on the wall prior to start of the formation. As expected, the amplitude of the eddy currents at the end of the simulation is reduced. The currents do not cancel exactly, because the presence of the pre-induced currents results in an expansion of the plasma, so that it reaches a radius of 46 cm with an elongation of 2.0.
3) In Case 3 (------) in addition to pre-inducing eddy currents in the chamber wall, the currents in the confinement coils are adjusted to compensate for the suppressed eddy currents. In other words, the field produced by the confinement coils in case 3 at t=0 is now equal to the field produced by both confinement coils and eddy currents in case 1 at t=200 us. This results in a plasma that is very similar to case 1 (radius 38 cm, elongation 2.5), but the eddy currents have been reduced by a factor of 10. Subsequent evolution of this plasma is therefore much less affected by wall eddy currents and thus easier to control and predict. Furthermore, by adjusting the pre-induced wall currents together with the confinement coils, the plasma separatrix radius can be directly controlled.

Other Advantages

To stabilize FRC position or shape, axisymmetric, conducting in-vessel passive structures may be used. If eddy currents are pre-induced in the in-vessel passive structures in a manner as described above, the in-vessel passive structures can be installed without affecting initial plasma shape and configuration. If, on the other hand, no currents are pre-induced, installation of the in-vessel passive structures will decrease the FRC radius and thus reduce the coupling between in-vessel passive structures and plasma to approximate the same coupling strength that was previously between the wall of the vessel and the plasma, neglecting much of the advantage of installing additional components in the vessel A similar issue applies to control coils. Where ex-vessel coils have insufficient plasma coupling to stabilize plasma instabilities and in-vessel coils are used, the in-vessel coils need to be protected from the plasma typically with an additional internal wall. If eddy currents in this in-vessel coil wall are not eliminated, they will reduce the plasma radius and the intended increase in coil-plasma coupling will be reduced. Therefore, eliminating eddy currents increases the coupling between coils and plasma, and thus reduces both current and voltage requirements for control coils.

Due to the 3-D shape of the vessel, any induced wall currents will break axisymmetry and potentially reduce confinement, excite instabilities, or otherwise reduce performance. Error field correction coils can be used to reduce a fixed number of specific harmonics, but are non-axisymmetric themselves and thus further amplify other sideband harmonics. In contrast, elimination of the eddy currents as described above requires only axisymmetric coils, results in less sideband harmonics, and does not require any currents in the coils after the plasma has formed.

In summary, the proposed systems and methods provided herein increase the chance of stabilizing plasma instabilities; increase the efficiency of plasma control systems by improving the coupling to the wall, reduces the amplitude of symmetry breaking 3-D fields, and lowers the complexity of the real-time systems. Up to some degree, all of these advantages can also be realized with very little cost by re-using existing coil systems. Best results can be achieved by taking eddy current elimination into account for coil placement and design.

The example embodiments provided herein advantageously reduces time-varying external fields due to decaying eddy currents, which interfere with plasma control; reduces symmetry-breaking effects of a non-axisymmetric wall (since both pre-induced and translation-induced eddy currents have the same 3-D structure, 3-D fields are reduced without the need for non-axisymmetric coils) and enables the installation of close fitting, axisymmetric, in-vessel structures to increase passive stabilization of axisymmetric and non-axisymmetric instabilities.

The example embodiments provided herein, however, are merely intended as illustrative examples and not to be limiting in any way.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for reducing undesired eddy currents induced in a conducting structure, the method comprising the steps of:
   inducing a first set of eddy currents in a conducting structure, and
   translating a plasma into the conducting structure, wherein the plasma translating into the plasma confinement vessel to inducing a second set of eddy currents in the conducting structure, wherein the first set of eddy currents being induced prior to the second set of eddy currents and having a distribution equal to and opposite in sign to the distribution of the second set of eddy currents to substantial cancel the second set of eddy currents upon inducement of the second set of eddy currents in the conducting structure.

2. The method of claim 1 wherein the conducting structure is a wall of a plasma confinement vessel.

3. The method of claim 1 wherein the step of inducing eddy currents in a conducting structure includes the steps of
   ramping up and holding coils about the conducting structure at a constant current until all eddy currents have decayed in the conducting structure, and
   interrupting current to the coils to allow the first set of eddy currents to excite in the conducting structures conserving the magnetic flux through the structures.

4. The method of claim 1 wherein the translating plasma injects a flux into the conducting structure that induces the second set of eddy currents in the conducting structure reducing the amplitude of eddy currents in the conducting structure back towards zero.

5. The method of claim 3 wherein the translating plasma injects a flux into the conducting structure that induces the second set of eddy currents in the conducting structure reducing the amplitude of eddy currents in the wall of the vessel back towards zero.

6. The method of claim 1 wherein the step of inducing a first set of eddy currents in a conducting structure includes the steps of
   ramping up and holding coils about the conducting structure at a constant current to produce the first set of eddy currents in the conducting structure, and
   wherein the translating plasma injects a flux into the conducting structure that induces the second set of eddy currents in the conducting structure reducing the amplitude of eddy currents in the conducting structure back towards zero.

7. A system for reducing undesired eddy currents induced in a vessel wall, the system comprising:
   a vessel having a wall and an interior,
   a formation section attached to an end of the vessel,
   a plurality coils positioned around the vessel, and
   a control system coupled to the plurality of coils and configured to induce a first set of eddy currents in the wall of the vessel prior to a second set of eddy currents being induced in the wall of the vessel, wherein the first set of eddy currents having a distribution equal to and opposite in sign to the distribution of the second set of eddy currents to substantial cancel the second set of eddy currents upon inducement of the second set of eddy currents in the wall of the chamber, wherein the control system is further configured to translate a plasma from the formation section into the interior of the vessel, wherein the translating plasma induces the second set of eddy currents in the wall of the vessel.

8. The system of claim 7 wherein the control system is further configured to ramp up and hold the plurality of coils at a constant current until all eddy currents in the wall of the vessel have decayed, and then interrupt the current to the plurality of coils to allow the first set of eddy currents to excite in the wall of the vessel conserving the flux through the vessel.

9. The system of claim 8 wherein the translating plasma injects a flux into the wall of the vessel that induces the second set of eddy currents in the wall of the vessel reducing the amplitude of eddy currents in the wall of the vessel back towards zero.

10. The system of claim 7 wherein the control system is further configured to ramp up and hold the plurality of coils at a constant current to produce the first set of eddy currents in the conducting structure.

11. The system of claim 10 wherein the translating plasma injects a flux into the wall of the vessel that induces the second set of eddy currents in the wall of the vessel reducing the amplitude of eddy currents in the wall of the vessel back towards zero.

12. A method for reducing undesired eddy currents induced in a wall of a vessel, the method comprising the steps of:
   inducing a first set of eddy currents in a wall of a vessel having a wall and an interior prior to inducing a second set of eddy currents in the wall of the vessel, and
   translating a plasma into the vessel, wherein the plasma translating into the plasma confinement vessel inducing a second set of eddy currents in the wall of the vessel, wherein the first set of eddy currents having a distribution equal to and opposite in sign to the distribution of the second set of eddy currents to substantial cancel the second set of eddy currents upon inducement of the second set of eddy currents in the wall of the vessel.

13. The method of claim 12 wherein the step of inducing eddy currents in the wall of the vessel includes the steps of ramping up and holding a plurality of coils positioned about the wall of the vessel at a constant current until all eddy currents have decayed in the wall of the vessel, and interrupting current to the plurality of coils to allow the first set of eddy currents to excite in the wall of the vessel conserving the magnetic flux through the wall of the vessel.

14. The method of claim 12 wherein the translating plasma injects a flux into the wall of the vessels that induces the second set of eddy currents in the wall of the vessel reducing the amplitude of eddy currents in the wall of the vessel back towards zero.

15. The method of claim 13 wherein the translating plasma injects a flux into the wall of the vessels that induces the second set of eddy currents in the wall of the vessel reducing the amplitude of eddy currents in the wall of the vessel back towards zero.

16. The method of claim 12 wherein the plasma is translated from opposing formation sections attached to opposite ends of the vessel.

17. The method of claim 16, further comprising the step of forming an FRC plasma in the opposing formation sections and wherein the step of translating a plasma into the vessel comprises translating the FRC plasma into the vessel.

18. The method of claim 12 wherein the step of inducing eddy currents in the wall of the vessel includes the steps of ramping up and holding a plurality of coils positioned about the wall of the vessel at a constant current to produce the first set of eddy currents in the wall of the vessel, and wherein the translating plasma injects a flux into the wall of the vessel that induces the second set of eddy currents in the wall of the vessel reducing the amplitude of eddy currents in the wall of the vessel back towards zero.

19. The method of claim 18 wherein the plasma is translated from opposing formation sections attached to opposite ends of the vessel.

20. The method of claim 19, further comprising the step of forming a field reversed configuration (FRC) plasma in the opposing formation sections and wherein the step of translating a plasma into the vessel comprises translating the FRC plasma into the vessel.

* * * * *